…

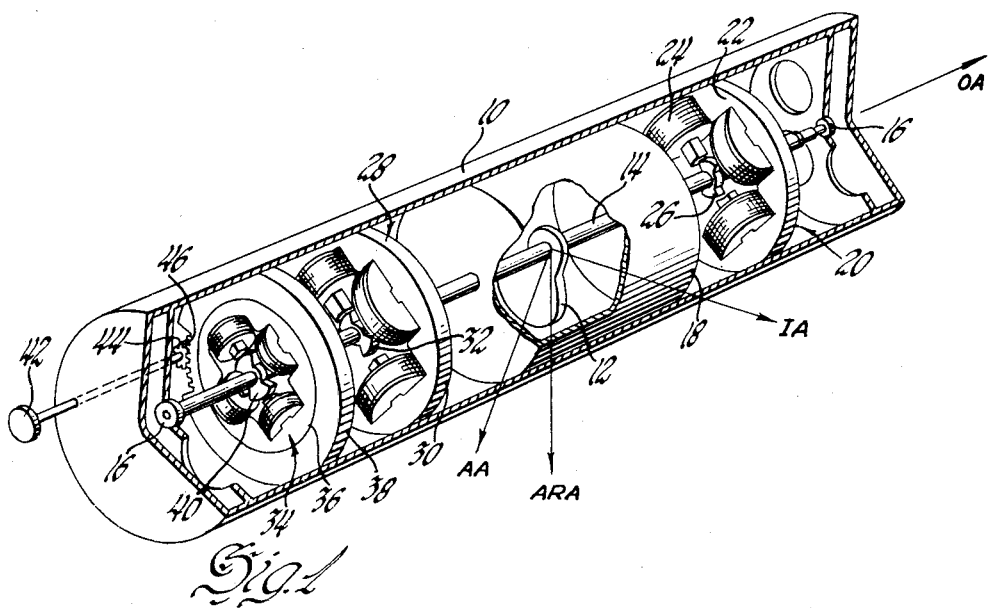

United States Patent Office 2,950,430
Patented Aug. 23, 1960

2,950,430
ELECTROMAGNETIC TORQUE MOTOR SYSTEM

Edwin F. Katz, Milwaukee, Wis., assignor to General Motors Corporation, Detroit, Mich., a corporation of Delaware Filed Nov. 24, 1958, Ser. No. 775,772
8 Claims. (Cl. 318—28)

This invention relates to electrically energized force generating devices and more particularly to electromagnetic torque motors.

Electromagnetic torque motors take a wide variety of forms and are of widespread application in measurement and computer systems. They are particularly useful in accelerometers and gyroscopes of the type adapted for navigation systems. However, the usefulness of the torque motor in a particular application depends, to a great extent, upon its torque-current characteristic. A common form of torque motor in such applications is the torque miscrosyn which is adapted for limited angular displacement and exhibits a somewhat non-linear relationship between torque and input current. Although the torque microsyn is admirably suited otherwise for use in navigation instruments, the commercially available microsyns have a torque-current characteristic which is unacceptable in systems requiring great precision.

In accordance with this invention, a desired torque-current relation is obtained by combining a selected part of the torque-current characteristic of a trimmer or auxiliary microsyn with that of a main microsyn. This may be accomplished by coupling the rotors of the main and trimmer microsyns to a common torque summing shaft and energizing the stator windings of the two microsyns from the same signal voltage source. In a particular configuration, both the currents and the torques of the two microsyns are added together to yield a composite torque-current characteristic. In order to obtain the desired shape of the composite characteristic, the torque level of the trimmer microsyn may be adjusted and simultaneously the shape of its torque-current characteristic may be varied by angular adjustment of the stator of the trimmer microsyn with respect to the stator of the main microsyn.

A more complete understanding of this invention may be had from the detailed description which follows taken in accordance with the accompanying drawings in which:

Figure 1 shows an accelerometer employing the present invention;

Figure 2 is a diagram showing the circuit configuration of a typical embodiment of the invention; and Figure 3 shows typical torque-current characteristics of torque microsyns.

It will be appreciated, as the description proceeds, that any desired shape of the composite torque-current characteristic may be attained by means of this invention. However, the invention will be described with reference to an illustrative embodiment in which a linear characteristic is utilized.

Referring now to the drawings, there is shown a single degree of freedom accelerometer wherein it is desired to obtain a precisely linear relationship between input acceleration and current input to the torque motors. The accelerometer is of the constrained pendulum type and comprises a cylindrical casing 10 within which a pendulum element or bob 12 is rigidly secured to a shaft 14. The shaft is supported by a pair of bearings 16 at its opposite ends for rotation about an output axis OA. The pendulum element 12 is contained within a cylindrical float 18 which is mounted upon the shaft for rotation therewith and the casing is filled with a viscous damping liquid which provides a buoyant force upon the float 18 which is substantially equal to the weight force of the rotative assembly to reduce the load on the bearings. Mounted within the casing 10 is a signal microsyn 20 of conventional design with a stator 22 with four equally spaced poles supporting excitation and output windings 24. A rotor 26 is mounted upon the shaft 14 for rotation therewith. Accordingly, the arm axis AA of the pendulum element 12 tends to become aligned with the resultant acceleration along the input axis IA and the output winding of the signal microsyn develops a signal voltage of amplitude and phase corresponding to the magnitude and direction of the angular displacement between the arm axis AA and the arm reference axis ARA.

For the purpose of providing a restoring torque on the shaft 14, there is provided a main microsyn 28 having its stator 30 secured to the casing 10 and provided with four equally spaced poles and having an armature or rotor 32 rigidly mounted upon the shaft 14. A trimmer microsyn 34, suitably of smaller size than the main microsyn, is axially aligned with the latter and its stator 36, with four equally spaced poles, is fixedly mounted in a support ring 38 and its rotor 40 is mounted upon the shaft 14. The support ring 38 is angularly adjustable with reference to the casing 10, and hence the stator of main microsyn 28, by an actuating member 42 which is supported for rotation in casing 10 and drives a pinion gear 44 which meshes with a gear segment 46 at the periphery of the support ring 38.

The circuit configuration of the constrained pendulum accelerometer is shown in Figure 2. The pendulum 12 responds to input accelerations to displace the rotor of the signal microsyn 20 which develops a signal voltage E. The signal voltage is applied to a high gain linear amplifier 48 which energizes the parallel connected input windings of the main torque microsyn 28 and trimmer microsyn 34. The input winding of microsyn 28 includes a pair of serially connected, oppositely wound, coils 50 and 52 which are supported respectively upon one pair of oppositely disposed stator poles and develop oppositely direct flux patterns as indicated by the arrows. An excitation winding for microsyn 28 is energized by a constant voltage $E_1$ and includes a pair of serially connected, oppositely wound, coils 54 and 56 which are supported respectively upon the other pair of oppositely disposed poles. The voltage $E_1$ is established at a value so that the current in the excitation winding is equal to the quiescent value of amplifier current in the input windings whereby the net torque on the rotor is zero in the absence of signal voltage on the amplifier.

The input windings of the trimmer microsyn 34 are connected serially with a variable resistor 58 and include a pair of serially connected, oppositely wound, coils 60 and 62 which are supported respectively upon one pair of oppositely disposed poles. An excitation winding for the trimmer microsyn is energized with a constant voltage $E_2$ and includes a pair of serially connected, oppositely wound, coils 64 and 66 which are supported respectively upon the other pair of oppositely disposed stator poles. The voltage $E_2$ is established at a value so that the current in the excitation winding is equal to the quiescent value of amplifier current in the input windings. The rotors 32 and 40 of the main and trimmer microsyns, respectively, are coupled to the shaft 14 of the pendulum so that a restoring torque equal to the summation of the output torques opposes displacement of the pendulum element 12. The restoring torque increases until it is equal to the torque developed by the input acceleration on the shaft 14 and with a known relation between the torque and current of the torque microsyns, the total or composite current is a measure of the input acceleration.

The main microsyn 28 has a torque-current characteristic as shown by curve $I_1$ and the trimmer microsyn 34 has a characteristic as shown by curve $I_2$ in Figure 3. The total or composite input current I to the torque microsyns is the sum of the current $I_1$ and the current $I_2$ and is represented by the curve I in Figure 3. In order to make the composite current I a linear function of the composite torque developed by the main and trimmer microsyns, the stator 36 of the trimmer microsyn is angularly adjusted by the actuator 42 with reference to the stator 30 of the main microsyn to select the desired portion of the non-linear relation between torque and rotor displacement of the trimmer microsyn. Simultaneously, the variable resistor 58 may be adjusted to establish the desired trimmer microsyn torque level, i.e. the desired relation between torque and applied voltage. It is thus apparent that a precisely linear relation may be obtained between composite current and the composite torque of the main and trimmer microsyns and the composite current is proportional to acceleration.

Although the description of this invention has been given with respect to a particular embodiment, it is not to be construed in a limiting sense. Numerous variations and modifications within the spirit and scope of the invention will now occur to those skilled in the art. For a definition of the invention, reference is made to the appended claims.

I claim:

1. In combination, a pair of electromagnetic torque motors each having a stator member, an armature member and an input winding on one of said members for energizing the motor to develop an output torque on the armature member, each of said motors having approximately linear torque-current characteristic, the input windings of said motors being electrically connected together and the armatures of said motors being mechanically connected together, and means for adjusting the torque level of one of said motors whereby a composite torque-current characteristic is obtained which is more nearly linear than that of either motor.

2. In combination, a pair of electromagnetic torque motors each having a stator member, an armature member and an input winding on one of said members for energizing the motor to develop an output torque on the armature member, the input windings of said motors being electrically connected together and the armatures of said motors being mechanically connected together, and means for relatively displacing the stator members for a given position of said armature members in order to obtain a predetermined composite torque-current characteristic.

3. In combination, a pair of electromagnetic torque motors each having a stator, a rotor, and an input winding on the stator for energizing the motor to develop an output torque on the rotor, the input winding of said motors being electrically connected together, a common output shaft supporting the rotors of said motors, support means holding said stators in axial alignment, one of said stators being angularly adjustable in said support means to obtain a predetermined composite torque-current characteristic.

4. In combination, a main torque microsyn and a trimmer torque microsyn, each of said microsyns having a stator, a rotor, and an input winding on the stator for energizing the microsyn to develop an output torque on the rotor, each of said microsyns having a non-linear torque-current characteristic, a signal voltage source of variable amplitude and phase, the input windings of said microsyns being connected in parallel across said source, a common output shaft connected with said rotors, support means holding said stators in axial alignment, means for angularly displacing the stator of the trimmer microsyn relative to the stator of the main microsyn, and utilization means connected with said output shaft.

5. In combination, a condition responsive device with an output shaft which is angularly displaced in accordance with the value of the condition, a signal generator actuated by said device and developing an output voltage corresponding in amplitude and phase to the magnitude and sense of the condition, first and second torque motors each having a rotor, a stator, and an input winding for energizing the motor to develop an output torque on the rotor, said motors having an approximately linear torque-current characteristic, the input circuits being connected electrically together and to said signal generator for energization in accordance with the value of said condition, the rotors being connected mechanically together and to the output shaft of said device to apply a restraining torque thereto which varies linearly as a function of the composite current to said motors.

6. In combination, a condition responsive device which develops a torque on an output shaft in accordance with the value of the condition, a signal generator actuated by said device and developing an output voltage corresponding in amplitude and phase to the magnitude and sense of the condition, first and second torque motors each having a rotor, a stator, and an input winding for energizing the motor to develop an output torque on the rotor, said motors having an approximately linear torque-current characteristic, the input circuits being connected in parallel across said signal generator for energization in accordance with the value of said condition, the rotors being connected mechanically together and to the output shaft of said device to apply a restraining torque thereto which varies linearly as a function of the composite current to said motors, whereby the value of said composite current is proportional to the value of said condition.

7. In combination, a condition responsive device which develops a torque on an output shaft in accordance with the value of the condition, a signal generator actuated by said device and developing an output voltage corresponding in amplitude and phase to the magnitude and sense of the condition, first and second torque motors each having a rotor, a stator, and an input winding for energizing each motor to develop an output torque on the rotor, said motors having an approximately linear characteristic, the input circuits being connected electrically together and to said signal generator for energization in accordance with the value of said condition, the rotors being connected mechanically together and to the output shaft of said device to apply a restraining torque thereto, support means for said stators, and means for angularly adjusting one stator relative to the other to establish a desired composite torque-current characteristic for said torque motors.

8. A constrained pendulum accelerometer including a support member, an output shaft supported for rotation by said support member, a pendulum fixed to said shaft for exerting a torque thereon in accordance with the value of acceleration in a plane normal to said shaft, a signal voltage generator coupled with said shaft for developing a signal voltage corresponding in amplitude and phase to the magnitude and direction of shaft displacement, a torque microsyn having its stator mounted on the support member and its rotor connected with the shaft, and an amplifier interposed between the output windings of the signal voltage generator and the input windings of the torque microsyn, said torque microsyn having an approximately linear torque-current characteristic whereby the current supplied by the amplifier is approximately proportional to input acceleration, a trimmer torque microsyn mounted on said support member and having its rotor mechanically coupled to said shaft and its input windings connected with the input windings of the other torque microsyn, the trimmer torque microsyn also having an approximately linear torque-current characteristic whereby the current supplied by the amplifier is more nearly proportional to the input acceleration.

References Cited in the file of this patent

UNITED STATES PATENTS 2,853,287   Draper et al. _____ Sept. 23, 1958